United States Patent [19]
Boulter

[11] Patent Number: 5,881,913
[45] Date of Patent: Mar. 16, 1999

[54] CONTAMINATION PROOF PURIFIED WATER DISPENSER

[75] Inventor: Roger Phillip Boulter, LaSalle, Colo.

[73] Assignee: Entre Pure Industries, Inc., LaSalle, Colo.

[21] Appl. No.: 90,604

[22] Filed: Jun. 4, 1998

Related U.S. Application Data

[62] Division of Ser. No. 759,134, Dec. 2, 1996.

[51] Int. Cl.$^6$ ..................................................... B67D 5/10
[52] U.S. Cl. .......................... 222/2; 222/182; 222/320; 222/537; 222/190; 141/91; 141/371; 141/374
[58] Field of Search .................. 141/91, 92, 97, 141/371, 374, 369; 222/2, 129, 129.1, 109, 111, 182, 320, 537, 190

[56] References Cited

U.S. PATENT DOCUMENTS

| | | | |
|---|---|---|---|
| D. 323,355 | 1/1992 | Dolifka | D20/3 |
| D. 341,627 | 11/1993 | Dolifka | D20/3 |
| 528,946 | 11/1894 | Knittel | 222/182 |
| 2,063,171 | 12/1936 | Kucher | 222/182 |
| 2,957,607 | 10/1960 | Smith | 222/129.4 |
| 3,221,859 | 12/1965 | McAbee | 210/662 |
| 3,375,913 | 4/1968 | Norris, Jr. | 210/262 |
| 3,493,496 | 2/1970 | Bray et al. | 222/386.5 |
| 3,630,378 | 12/1971 | Bauman | 210/257 |
| 3,856,676 | 12/1974 | Grimme, Jr. et al. | 210/96 |
| 4,160,727 | 7/1979 | Harris, Jr. | 210/23 H |
| 4,226,267 | 10/1980 | Meacham, Jr. | 141/18 |
| 4,235,352 | 11/1980 | Newman et al. | 222/129 |
| 4,501,381 | 2/1985 | Hart | 222/2 |
| 4,623,467 | 11/1986 | Hamlin | 210/652 |
| 4,801,375 | 1/1989 | Padilla | 210/100 |
| 4,881,661 | 11/1989 | Jones | 222/67 |
| 4,911,212 | 3/1990 | Burton | 141/369 |
| 4,923,091 | 5/1990 | Sutera | 222/67 |
| 4,969,991 | 11/1990 | Valadez | 210/96.2 |
| 4,997,553 | 3/1991 | Clack | 210/97 |
| 5,112,477 | 5/1992 | Hamlin | 222/146.6 X |
| 5,114,042 | 5/1992 | Sutera | 222/67 |
| 5,299,604 | 4/1994 | Pierce | 141/18 |
| 5,368,197 | 11/1994 | Sutera | 222/67 |
| 5,373,874 | 12/1994 | Shieh | 222/129.1 X |
| 5,409,094 | 4/1995 | Muraco | 194/317 |
| 5,507,329 | 4/1996 | Shub | 222/129.1 X |
| 5,582,717 | 12/1996 | Di Santo | 210/86 |
| 5,782,380 | 7/1998 | DiSanto | 222/2 |

*Primary Examiner*—Kenneth Bomberg
*Attorney, Agent, or Firm*—Rick Martin

[57] ABSTRACT

A coin-operated purified water dispensing machine has an exterior housing shaped like a kiosk for a mall. A state of the art water purification system is housed in the kiosk. A unique combination of an RO filter and a bladder type storage tank minimizes the necessary components to pump and measure the purified water. A unique tamper proof and bacteria resistant nozzle assembly includes a retractable nozzle having a shutter door to prevent access while in the passive mode. A pinch valve assembly controls the water flow in a non-invasive manner. Also a continuous flow of ozone to the nozzle assembly deters bacteria growth.

9 Claims, 11 Drawing Sheets

CONTAMINATION PROOF PURIFIED WATER DISPENSER

CROSS REFERENCE PATENTS

This application is a divisional application of parent application Ser. No. 08/759,134 filed Dec. 2, 1996.

FIELD OF INVENTION

The present invention relates to a coin-operated purified water kiosk which prevents access to the nozzle during the passive mode by using a retractable nozzle assembly.

BACKGROUND OF THE INVENTION

Nowhere in the known prior art is a purified water dispensing system machine designed to address the nozzle sterilization problems associated with an unattended public usage. Consumers may include children having dirty fingers and/or bubble gum. Nozzles are also exposed to insects and bacteria. A brief summary of the prior art follows below.

U.S. Pat. No. 3,221,859 (1965) to McAbee discloses a coin operated de-ionized water dispenser.

U.S. Pat. No. 4,226,267 (1980) to Meacham, Jr. discloses a coffee vending machine having a plurality of water containers and a switching mechanism activated upon the emptying of a water container.

U.S. Pat. No. 4,501,381 (1985) to Hart discloses a coin operated purified water dispenser having a fixed pair of fill tubes.

U.S. Pat. No. 4,881,661 (1989) to Jones discloses a water bottle refill system to inject tap water into an inverted water bottle.

U.S. Pat. No. 4,911,212 (1990) to Burton discloses a refillable pressurized bottle and venting machine combination. A gripping mechanism and retractable probe fill and pressurize the bottle in the vending machine.

U.S. Pat. No. 4,923,091 (1990) to Sutera discloses a tap water filling system for an inverted water bottle.

U.S. Pat. No. 5,114,042 (1992) to Sutera discloses a tap water filling system for an inverted water bottle.

U.S. Pat. No. Des. 323,355 (1992) to Dolifka discloses an exterior design for a coin operated purified water dispensing station.

U.S. Pat. No. Des. 341,627 (1993) to Dolifka discloses an exterior design for a coin operated purified water dispensing station.

U.S. Pat. No. 5,299,604 (1994) to Pierce discloses a vending apparatus using re-sealable, refillable cans.

U.S. Pat. No. 5,368,197 (1994) to Sutera discloses a tap water kit for filling an inverted water bottle.

U.S. Pat. No. 5,409,094 (1995) to Muraco discloses a coin operated inverted water bottle dispenser.

Hart address the problems of simplifying the delivery of a precise volume of purified water in a coin-operated machine. A fill tube and piston arrangement deliver a precise volume of purified water regardless of varying water pressure. To keep the dispensing assembly sanitary Hart uses a telescoping shroud. A fixed dispensing nozzle is centered inside the shroud. Unfortunately children's fingers and/or insects can reach the dispensing nozzle. Additionally no provision is made to prevent bacteria growth.

The present invention greatly improves the sanitary environment of the dispensing nozzle in a coin operated consumer dispenser. First, the nozzle retracts into a closed compartment when not in use. Second, the flow is controlled by a non-invasive pinch valve. Third, the entire dispensing assembly is constantly fed a supply of ozone. There is also taught a simplified and compact purified water storage tank to reduce the machine cost and minimize maintenance.

SUMMARY OF THE INVENTION

The primary object of the present invention is to maintain a purified water dispensing nozzle in a sanitary and tamper proof environment.

Another object of the present invention is to combine an RO filtration with a bladder style storage tank to provide a compact and simplified purified water storage tank.

Another object of the present invention is to use city pressure and RO pump pressure to pump the purified water, thus eliminating the need for a centrifugal pump.

Other objects of this invention will appear from the following description and appended claims, reference being made to the accompanying drawings forming a part of this specification wherein like reference characters designate corresponding parts in the several views.

A kiosk houses a state of the art water purification system. At least two coin operated bottle filling stations are provided. A nozzle assembly has a sliding door and a retractable nozzle which protects the nozzle when it is not flowing water. An ozone environment kills bacteria. The water control valve does not touch the water. It is a non-invasive pinch valve type.

To conserve on storage space and eliminate the need for a centrifugal pump, a storage tank has a bladder filled with city water at 30 psi. This pressure is used to force the purified water from the outer chamber (pure water side) of the tank. Typical bladder tanks fill the bladder with air to force the water from the outer tank. This typical usage wastes over half of the storage capacity of the tank.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
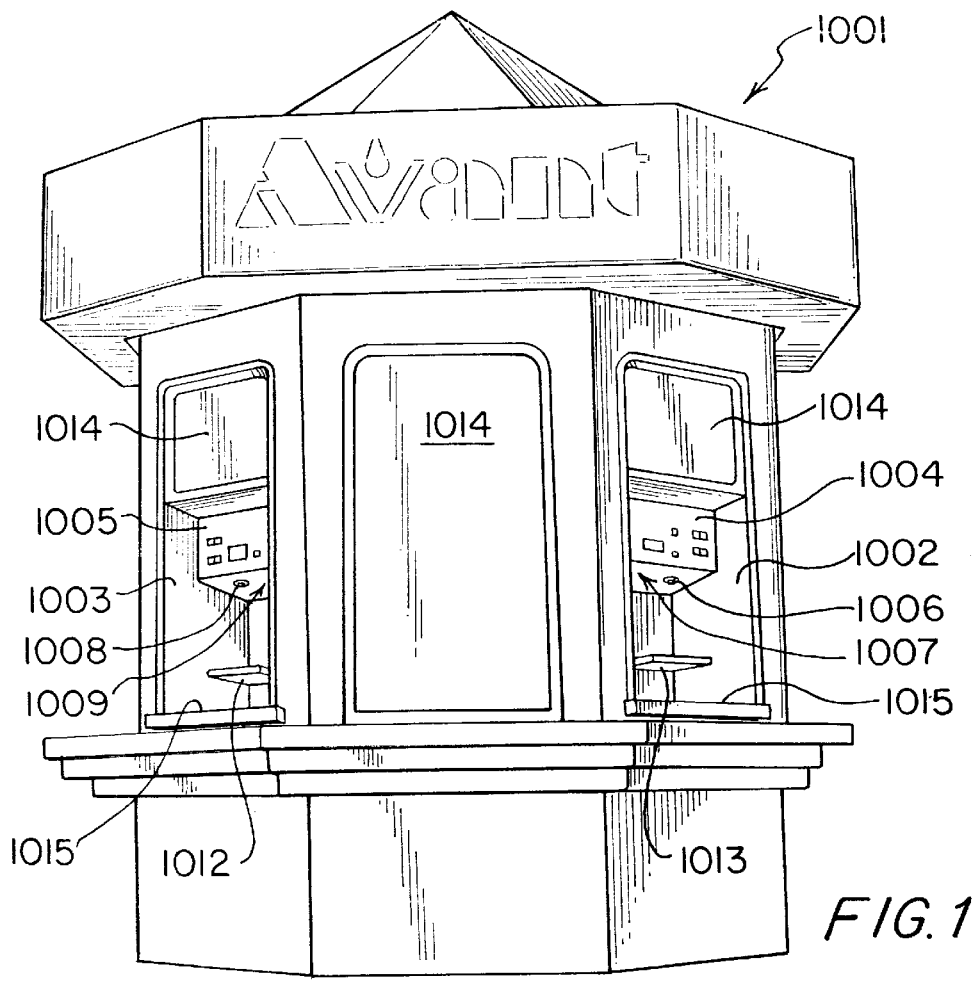
FIG. 1 is a side plan view of the front of the preferred embodiment of the water dispenser.
Figure 2:
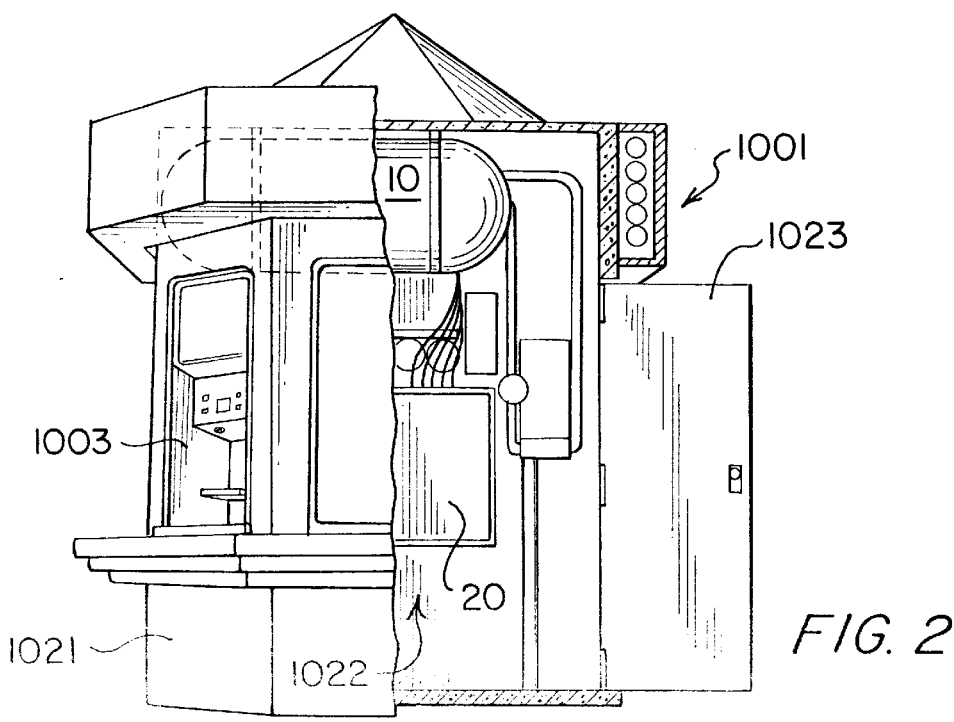
FIG. 2 is a partial cutaway view of the drawing in FIG. 1 showing the maintenance access door and filter system.
Figure 12:
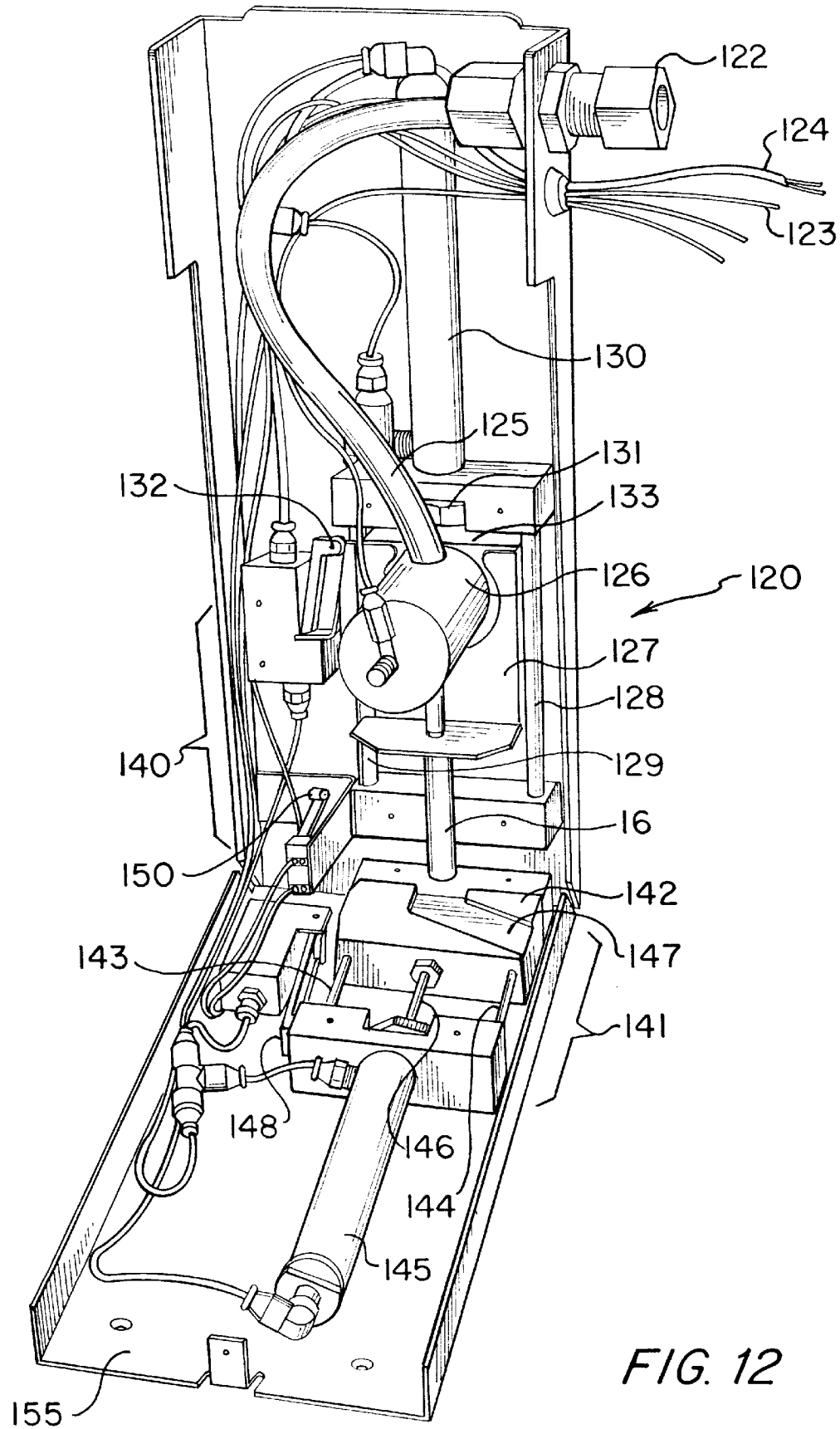
FIG. 12 is a top perspective view of the inside of the nozzle assembly with the nozzle in the retracted position.

Referring first to FIGS. 1,2 a water dispenser 1001 is shaped like a kiosk having signage 1014 to instruct the consumer how to operate the coin-operated dispensers 1004, 1005. The coin-operated dispensers 1004, 1005 are housed in vend windows 1002, 1003. Each coin-operated dispenser 1004, 1005 has two nozzle protectors 1008, 1009 and 1006, 1007. A separate filler mechanism 120 (FIG. 12) serves each nozzle protector and its nozzle 16 (FIG. 12).

In operation the consumer places his five gallon bottle on a ledge 1015. The consumer can place his one gallon bottle on a folding shelf 1012, 1013. The housing 1021 of water dispenser 1001 has maintenance door 1023 for access to the machine room 1022 of FIG. 2. Controller 20 and storage tank 10 are shown.

Figure 3:
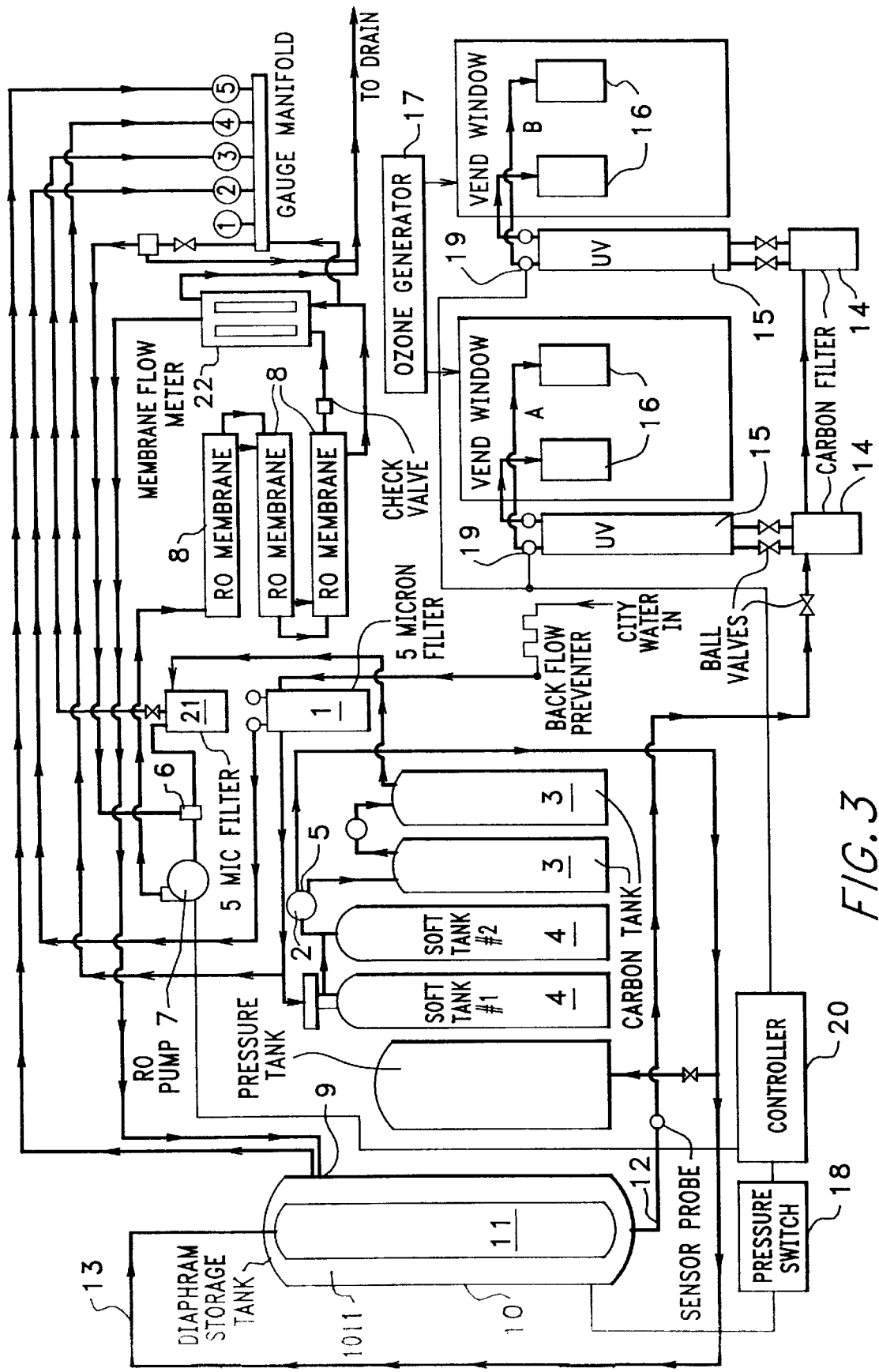
FIG. 3 is a diagrammatic view of the filter system shown in FIG. 2.
Figure 6:
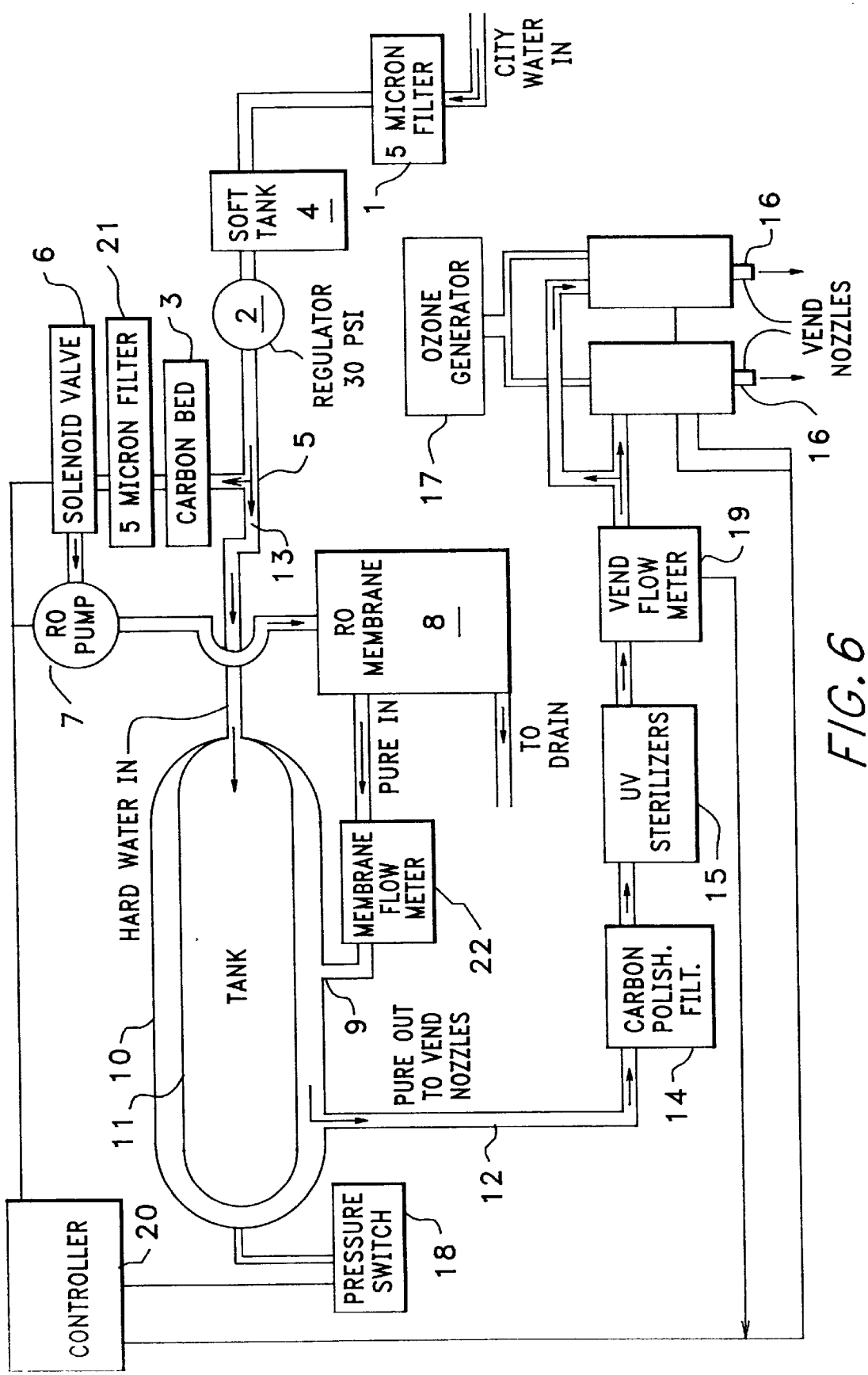
FIG. 6 is a schematic view of the filter and storage system.
Figure 7:
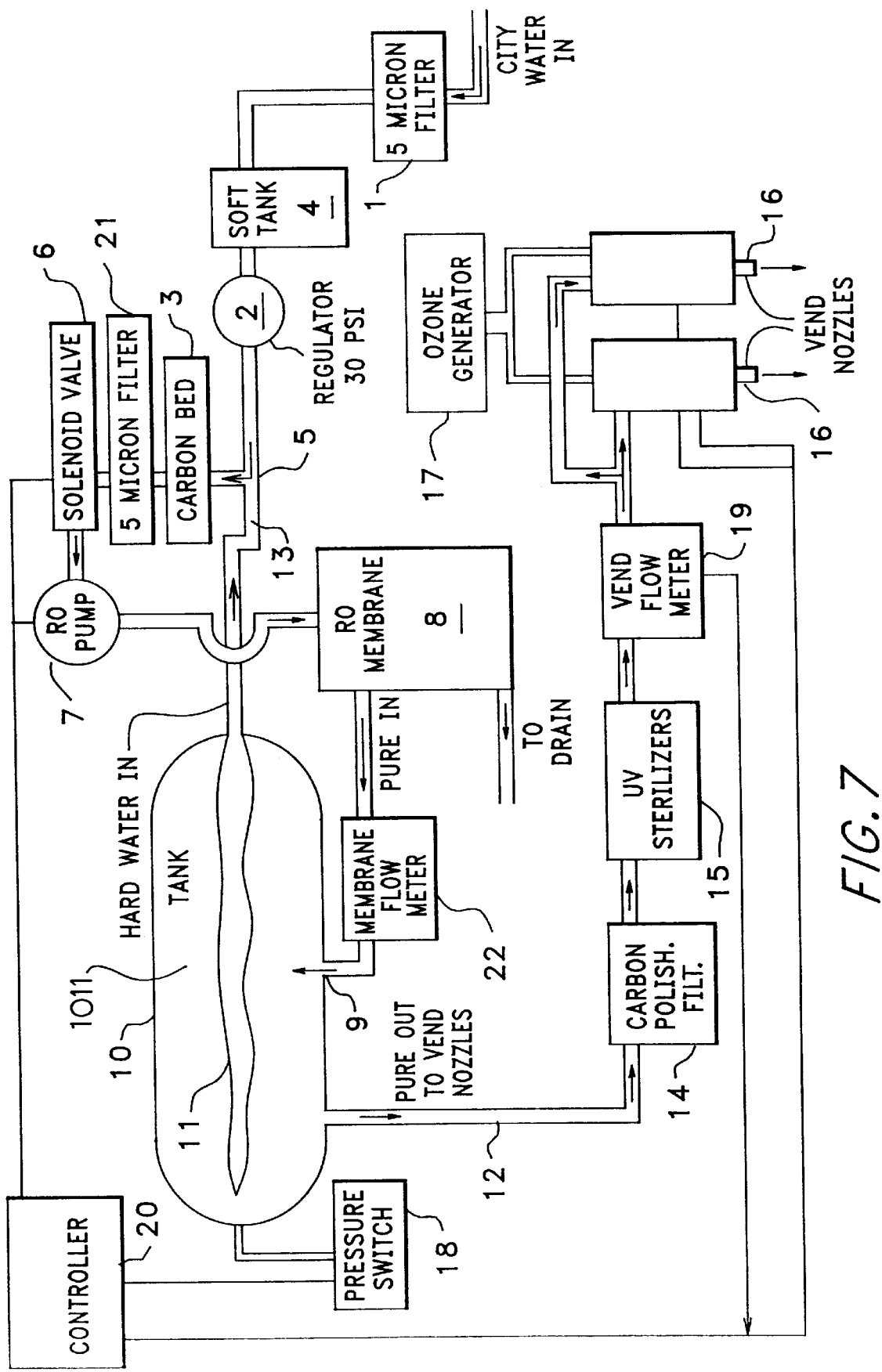
FIG. 7 is the same view as FIG. 6 having the bladder in the deflated state with the outer tank at near maximum storage of purified water.
Figure 8:
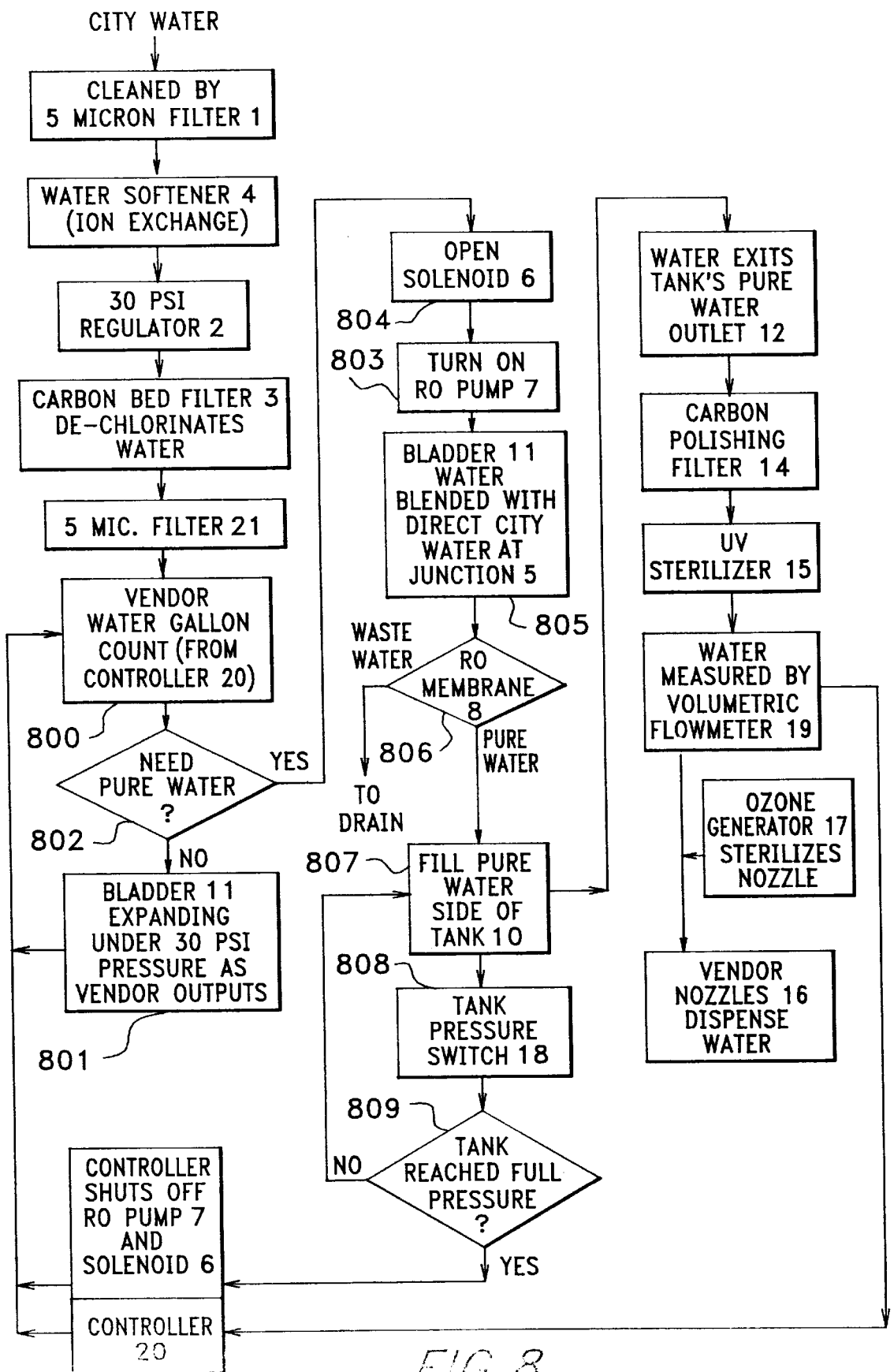
FIG. 8 is a logic flow chart showing the operation of the filter and storage system.

Referring next to FIG. 3 the machinery housed in the machine room 1022 is shown in a schematic format approximately laid out as in the machine room 1022. FIGS. 6,7 are simplified schematics of the same machinery. FIG. 7 shows the inner bladder 11 in the deflated mode. The logic flow chart of FIG. 8 describes the operational sequence of steps. All the numbers of the components are coordinated to be the same.

Referring next to FIGS. 3, 6, 7, 8 the city water is first filtered by a 5 micron filter 1. Next an ion exchange water softener 4 removes the hardness from the water. Next the water pressure is regulated at 30 psi by regulator 2. Junction 5 allows the water to flow either into water inlet 13 or into a carbon bed filter 3 to de-chlorinate the water. After the carbon bed filter 3, a second 5 micron filter 21 removes any carbon particles from the water. Water inlet 13 feeds the inner bladder 11. Automatically the inner bladder 11 expands under the direct connect to the 30 psi city water (functional block 801). The controller 20 has a counter which counts the total gallons of the purified water dispensed as measured by the membrane flowmeter 22 (functional block 800). The purified water is stored in the pure water side 1011 of the diaphragm storage tank 10. When the counter reaches a preset limit (functional block 802), the controller turns on the reverse osmosis (RO) pump 7 as depicted by functional block 803 and opens the solenoid 6 (functional block 804). The RO pump 7 draws water from both the city water line and the inner bladder 11 through the carbon bed filter 3 and the second 5 micron filter 21. Junction 5 shows the blending of the waters (functional block 805). In a known manner the RO membrane 8 returns about 50% of its input to drain as this water is the high concentrate by-product of the RO process (functional block 806). Inlet 9 shows where the purified water from the RO membrane 8 enters the pure water side 1011 of the diaphragm storage tank 10 (functional block 807). Pressure limit switch 18 shuts off the RO pump (functional blocks 808, 809).

The vendor nozzles 16 dispense water under the control of the coin-operated dispensers (FIG. 2, numbers 1004, 1005). The water is further filtered by the carbon polishing filter 14 and the UV sterilizer 15 as it flows from the pure water outlet 12. All dispensed purified water is volumetrically measured by vend flowmeter 19. The ozone generator 17 constantly discharges ozone in the vendor nozzle 16 environment.

Figure 4:
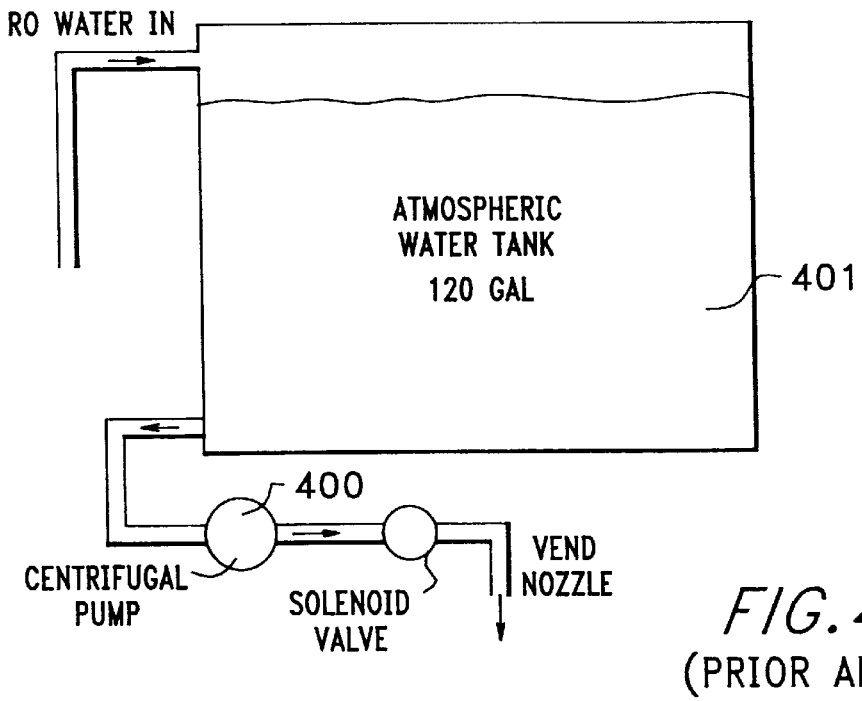
FIG. 4 (prior art) is a diagrammatic view of a centrifugal pump storage system.

The above system reduces the need for a traditional centrifugal pump 400 as shown in FIG. 4. Centrifugal pumps are notoriously prone to breakdown. Also, the above system uses the 30 psi city water pressure in part to force the purified water from the pure water side 1011 of the tank 10, thus conserving energy. The storage tank 401 of FIG. 4 serves the same purpose as the pure water side 1011 of tank 10 of FIGS. 6,7.

Figure 5:
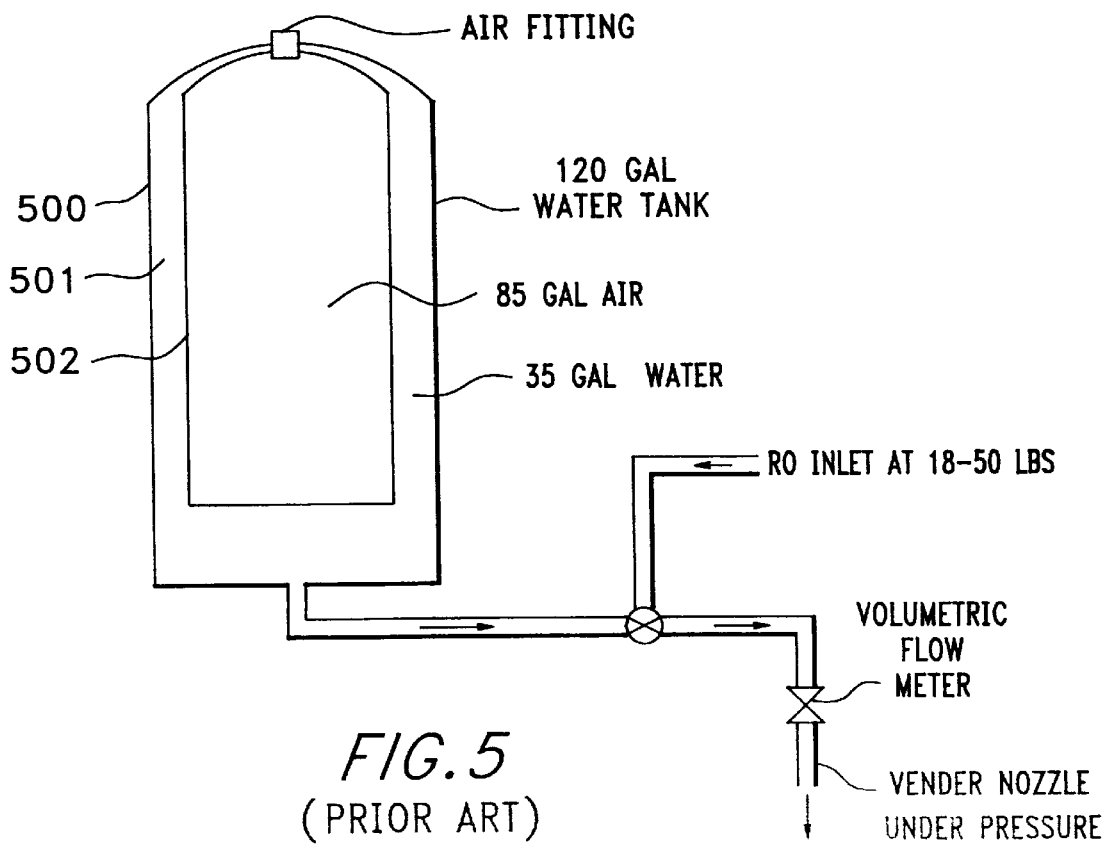
FIG. 5 (prior art) is a diagrammatic view of a bladder type storage tank.

Another prior art system is shown in FIG. 5. The diaphragm storage tank 500 is used in a known manner wherein the bladder 502 is pressurized in order to provide the force to flow the purified water from the pure water side 501 of the tank 500. However, about 85 gallons of air is needed for exit pressure. Thus, only 35 gallons of the 120 gallon tank can store pure water. This space loss is unacceptable in kiosks where space is at a premium. The present invention uses the efficiency of the FIG. 5 air bladder system while saving 85/120 (70%) of the storage tank size requirements.

In summary the process described above can be described as:

pre-filtering city water;

piping the pre-filtered water into an inner bladder of a diaphragm storage tank, to provide pressure to dispense pure water from the diaphragm storage tank;

storing RO filtered water in the pure water storage side of the diaphragm storage tank;

feeding an RO pump with a blend of the stored water in the inner bladder and the pre-filtered city water which has been de-chlorinated;

dispensing the filtered water in the pure water storage side of the diaphragm storage tank after further filtering the water;

measuring the volume of dispensed water; and controlling the RO pump by the measuring the volume of dispensed water so as to maintain a selected minimum volume of water in the pure water side of the diaphragm storage tank.

Figure 9:
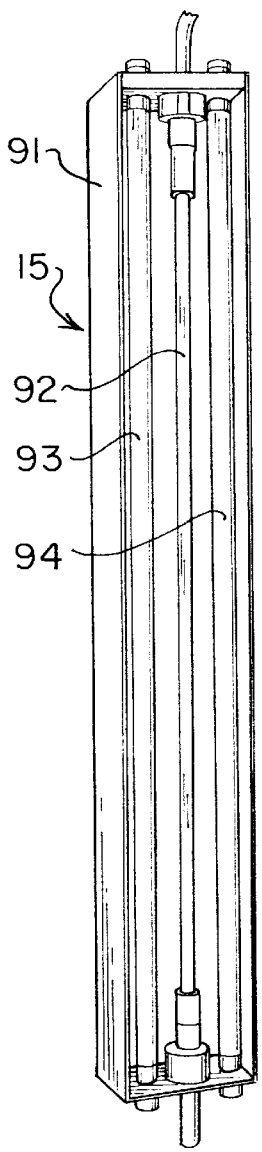
FIG. 9 is a front perspective view of the UV portion of the filter system.

Referring next to FIG. 9 the UV sterilizer 15 is shown with its front cover removed. The housing 91 is preferably made of stainless steel. The UV lamp 92 is known in the art. Water pipes 93, 94, preferably made of quartz, are transparent to allow the water to be exposed to the UV light.

Figure 10:
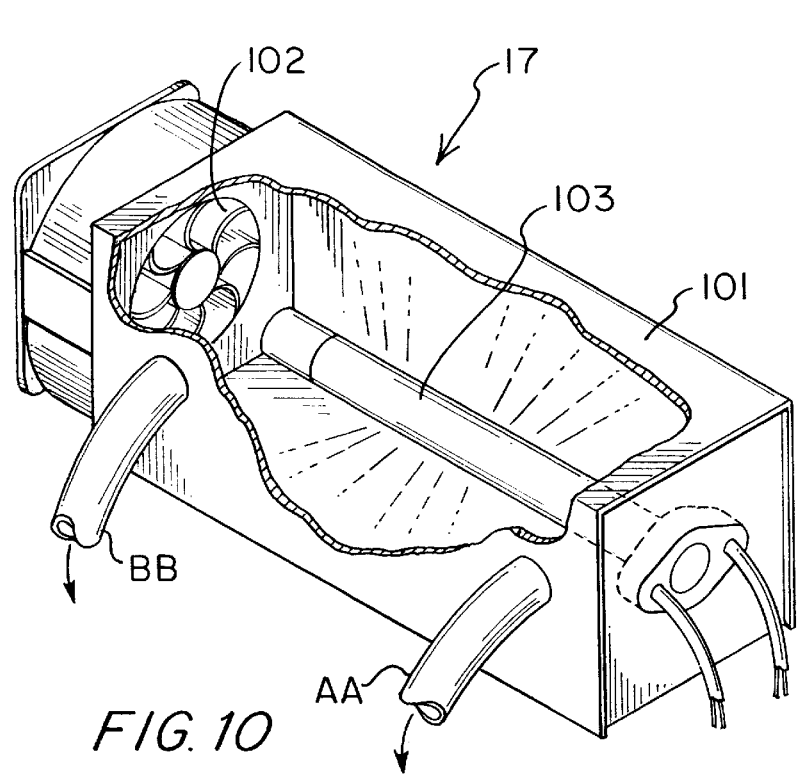
FIG. 10 is a cutaway view of the ozone generator.

Referring next to FIG. 10 the ozone generator 17 has a housing 101 enclosing a fan 102 and an ozone lamp 103. Outlet hoses AA, BB each serve a filler mechanism 120. Since each vend window has two filler mechanisms 120, each outlet hose AA, BB has a T connection not shown.

Figure 11:
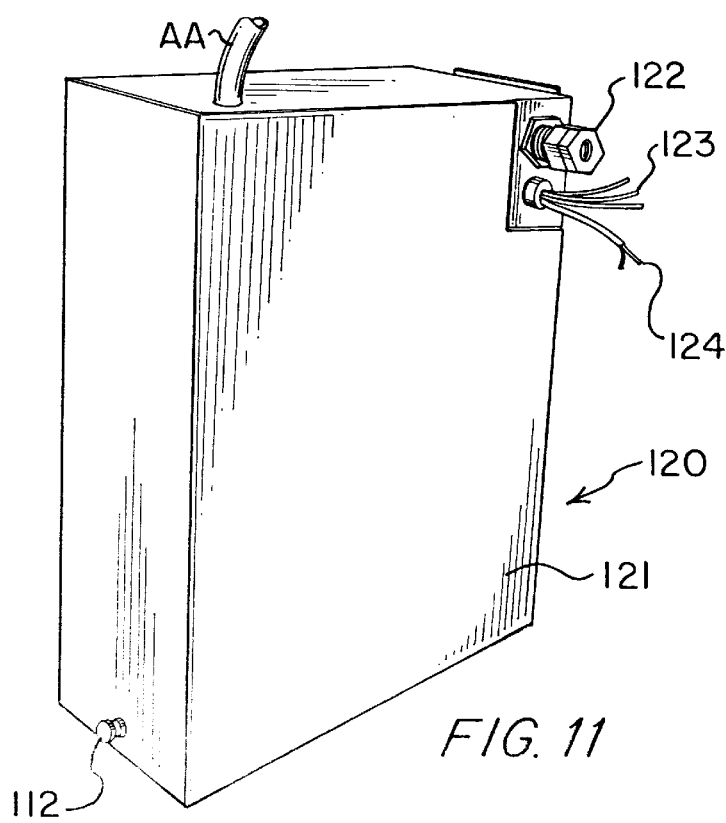
FIG. 11 is a side view of the nozzle assembly enclosure.

Referring next to FIG. 11 a filler mechanism 120 has a removable housing 121 having a locking screw 112. The ozone is fed in through hose AA. The water inlet connection 122 is a hard screw type to allow quick disconnect for maintenance. Pneumatic lines 123 power all the moving parts while electrical wires 124 serve the micro switches in the filler mechanism.

Referring next to FIG. 12 the filler mechanism 120 has two basic assemblies. The moving pinch valve assembly 140 controls the flow of water and the extension/retraction of the nozzle 16. The shutter assembly 141 forbids access to the nozzle 16 when the filler mechanism is in the passive mode.

The moving pinch valve assembly 140 consists of a flexible water inlet tube 125 and a pinch valve 126 which is mounted to a sliding block 133. The sliding block 133 slides on guide posts 128, 129. A mounting bracket 127 secures the nozzle 16. An actuator 130 having a push rod 131 controllably moves the sliding block into either the retracted position shown or the extended position shown in FIG. 13. The limit switch 132 senses when the sliding block is in the retracted position. The controller 20 closes the shutter 142 when the limit switch 132 senses the sliding block is in the retracted position. The limit switch 150 senses when the nozzle assembly is in the fully extended position so the controller 20 can initiate the dispensing of water.

Figure 13:
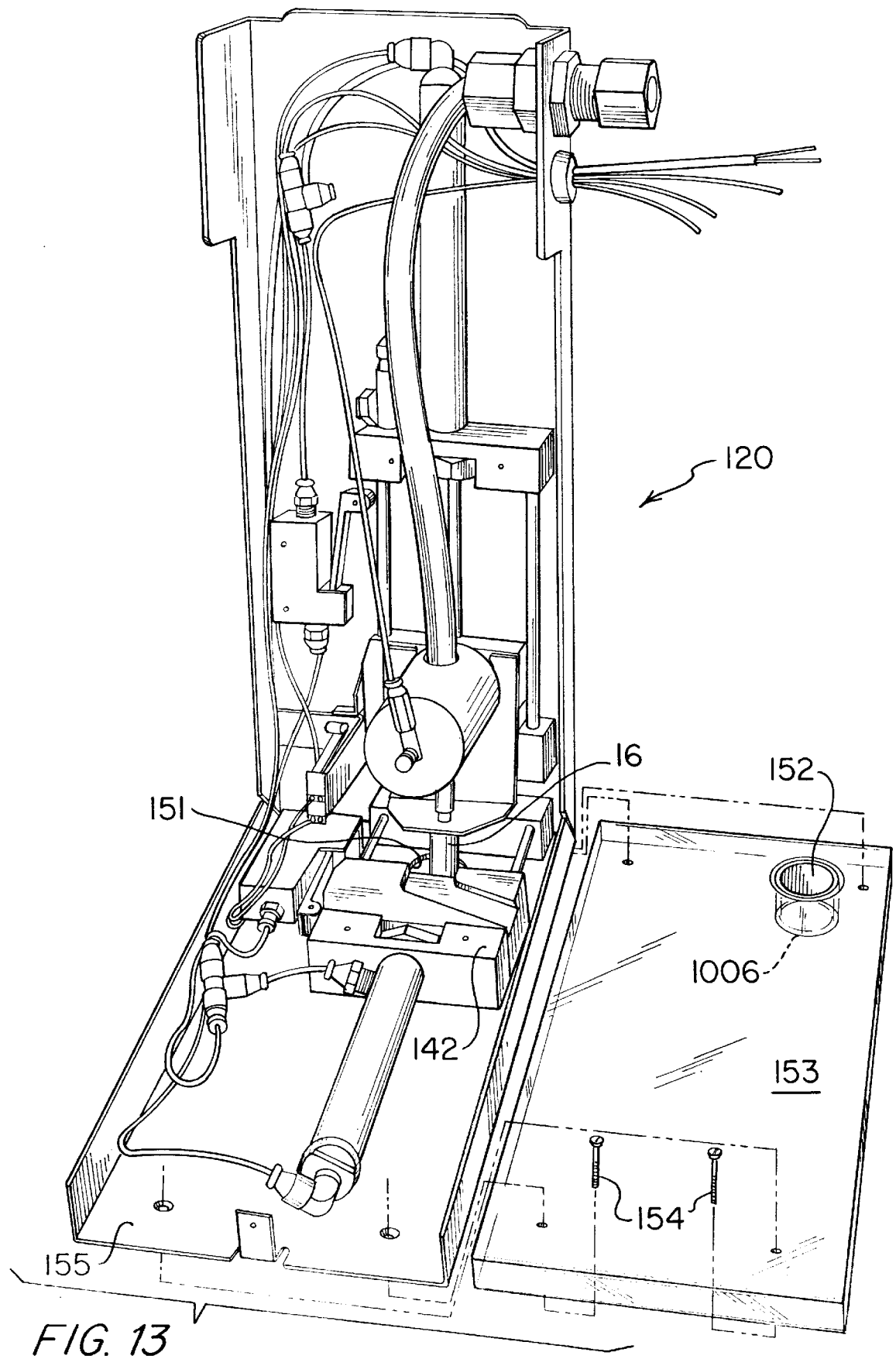
FIG. 13 is the same view as FIG. 12 with the nozzle in the extended position.

The shutter assembly 141 consists of a shutter 142, guide posts 143, 144 and an actuator 145 having a push rod 146. The drainage groove 147 diverts water drips to the side of the housing. The limit switch 148 senses the retracted position of the shutter 142. When the shutter is in the retracted position, the controller 20 activates the nozzle assembly to extend. Preferably both the pinch valve and shutter actuators are pneumatic. FIG. 13 shows the shutter 142 open and the nozzle 16 extended through hole 151. Hole 151 aligns with hole 152 of the clear plastic baseplate 153. The nozzle protector 1006 is shown in FIG. 1. Bolts 154 secure the baseplate 153 to the base 155 of the filler mechanism 120.

Figure 14:
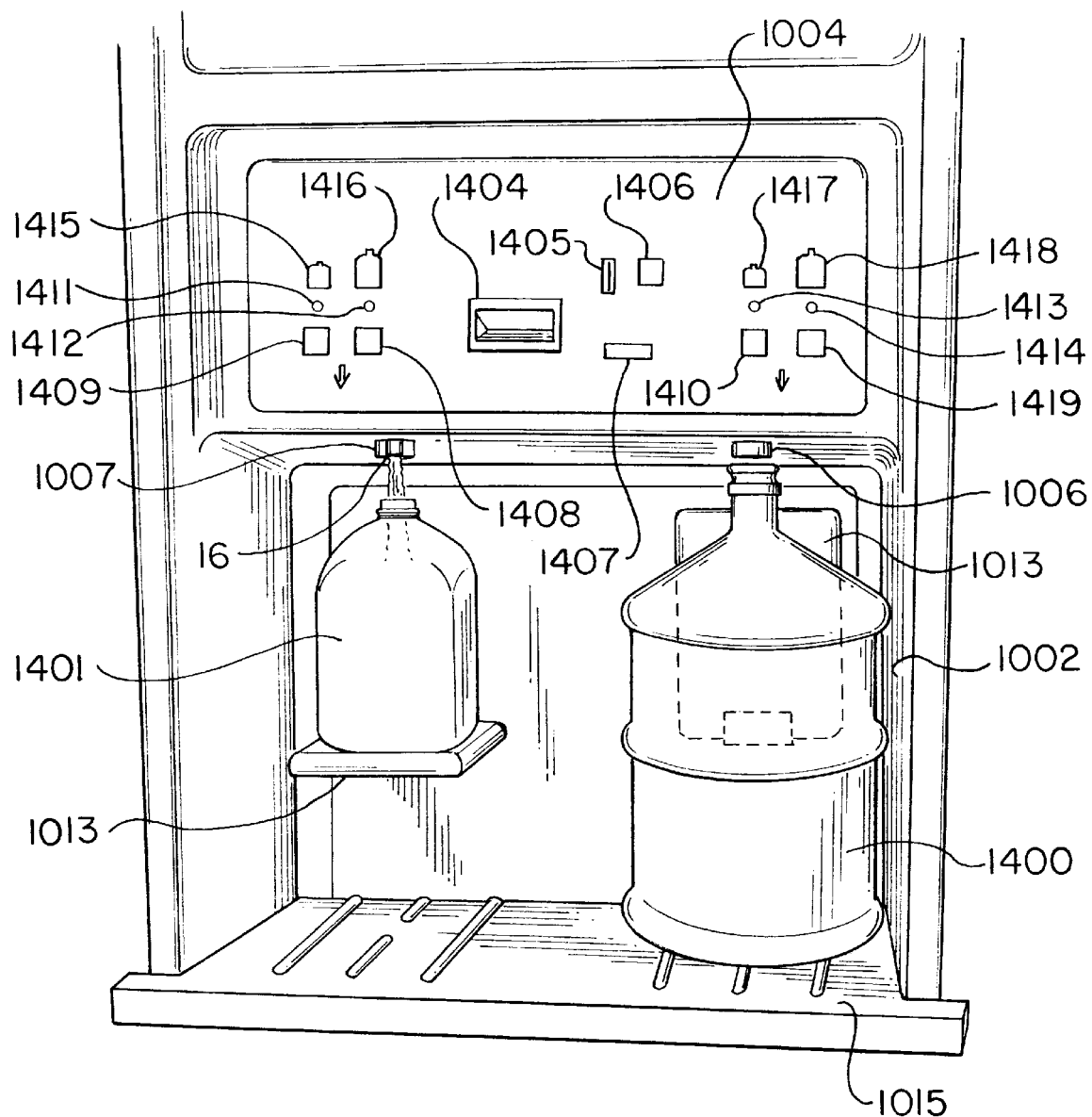
FIG. 14 is a front plan view of one filling station.

Referring next to FIG. 14 the vend window 1002 is filling a one gallon bottle 1401 and a five gallon bottle 1400. The folding shelf 1013 is supporting the one gallon bottle. The coin operated dispenser 1004 is designed for one user having multiple bottles to fill. A bill acceptor 1404 and a coin slot 1405 accept money. A coin return button 1406 returns money. A credit display 1407 shows the user how much money he has deposited. There is a five gallon start button 1419, 1408 on each side. There is a one gallon start button 1409, 1410 on each side. The LED lights 1411, 1412, 1413, 1414 indicate which button has been pushed. Bottle pictures 1415, 1416, 1417, 1418 prompt the user to hit the right button for his bottle size.

Figure 16:
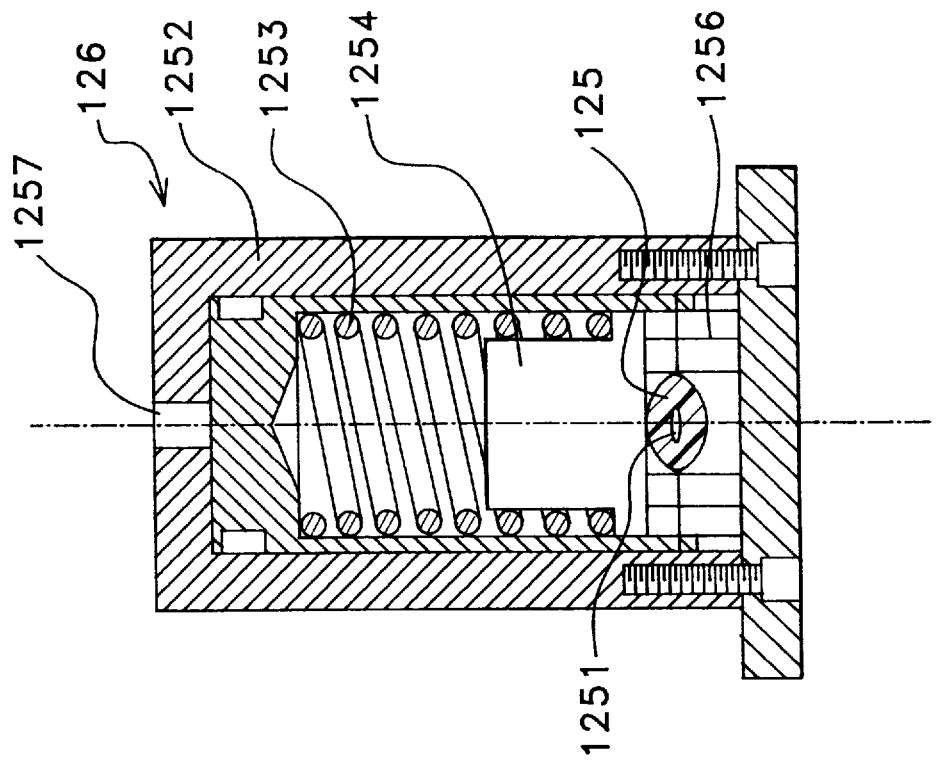
FIG. 16 (prior art) is the same view as FIG. 15 with the pinch valve in the closed position.
Figure 15:
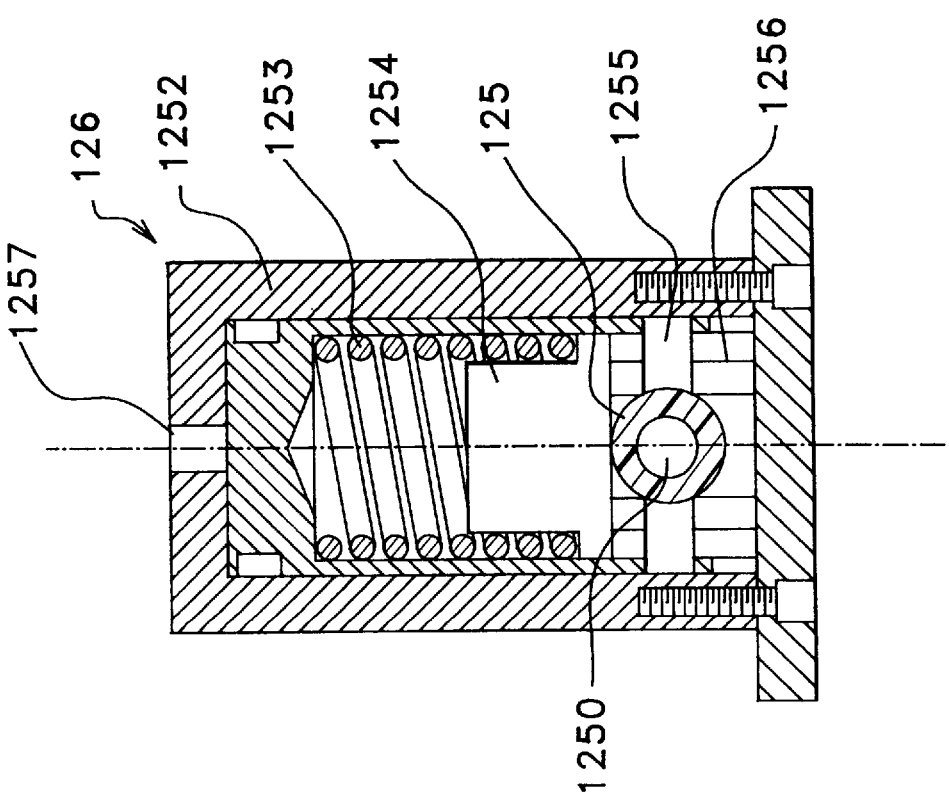
FIG. 15 (prior art) is a sectional view of the pinch valve the open position.

Referring next to FIGS. 15, 16 the pinch valve 126 is seen to have a housing 1252, a base 1256 and a piston 1254. Pressurized air entering inlet 1257 drives the piston 1254 against the hose 125 which has an orifice 1250. In FIG. 15 the hose 125 rests in space 1255 and air pressure holds the piston upwards in an open position. In FIG. 16 the spring 1253 has moved the piston 1254 to a normally closed position thus closing orifice 1250 down into a closure 1251.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A filler mechanism comprising:

a fluid source;

a retractable nozzle;

a shutter assembly;

a valve; and a controller, whereby the controller opens a shutter in the shutter assembly, moves the nozzle past the shutter, and opens the valve, thereby providing for a flow of the fluid out of the nozzle.

2. The mechanism of claim 1, wherein the valve further comprises a moving valve affixed to the nozzle.

3. The mechanism of claim 2, wherein the valve further comprises a pinch valve.

4. A The mechanism of claim 2 further comprising an ozone generator feeding an ozone gas around the nozzle.

5. The mechanism of claim 4 further comprising a housing enclosing the retractable nozzle, the shutter assembly, the valve and the ozone gas.

6. The mechanism of claim 5, wherein the shutter and the retractable nozzle each have limit switches connected to the controller.

7. The mechanism of claim 6, wherein the retractable nozzle and the shutter assembly each further comprise a pneumatic actuator.

8. A purified water dispensing kiosk comprising:

a housing having a machine room and a vend window;

said vend window having a pair of coin-operated filler mechanisms;

said coin-operated filler mechanism each further comprising:

a retractable nozzle in an enclosure;

a shutter in the enclosure functioning to controllably permit an extension of the nozzle; and an ozone supply.

9. A filler mechanism comprising:

a fluid source;

a retractable nozzle;

a shutter assembly;

a valve;

a controller, whereby the controller opens a shutter in the shutter assembly, moves the nozzle past the shutter, and opens the valve, thereby providing for a flow of the fluid out of the nozzle; and an ozone generator feeding an ozone gas around the nozzle.

* * * * *